UNITED STATES PATENT OFFICE.

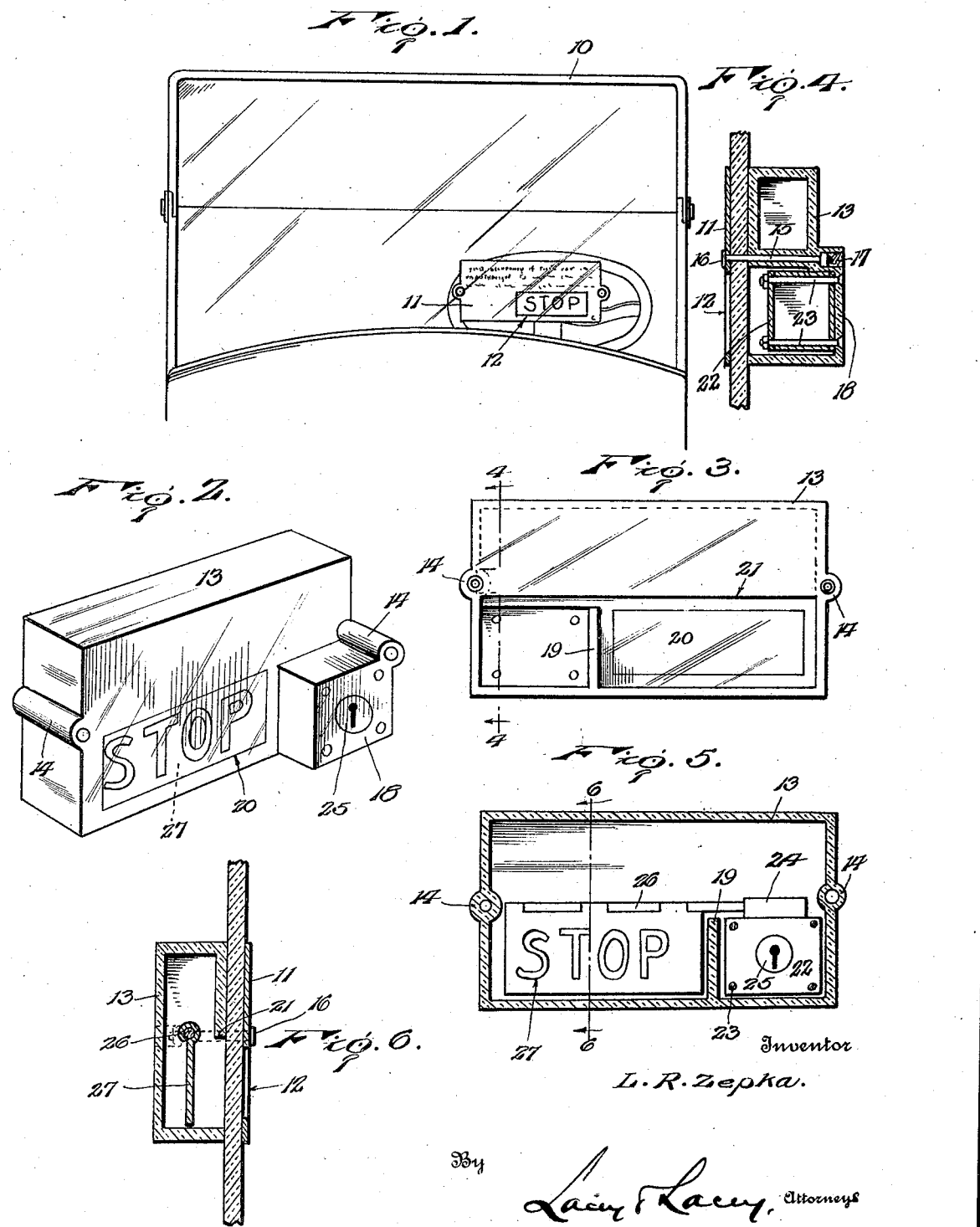

LUDWIG R. ZEPKA, OF CLEVELAND, OHIO.

MOTOR-VEHICLE PROTECTOR.

1,419,093. Specification of Letters Patent. Patented June 6, 1922.

Application filed April 22, 1921. Serial No. 463,697.

*To all whom it may concern:*

Be it known that I, LUDWIG R. ZEPKA, a citizen of the United States, residing at Cleveland, in the county of Cuyahoga and State of Ohio, have invented certain new and useful Improvements in Motor-Vehicle Protectors, of which the following is a specification.

This invention relates to an improved theft signal for motor vehicles and has one of its pincipal objects to provide a device of this character by means of which the unauthorized use of a vehicle may be visibly indicated so that likelihood of theft of the vehicle will be reduced to a minimum.

The invention has as a further object to provide a device which will be secured to the glass of the wind shield of the vehicle in such manner that the device cannot, under ordinary conditions, be removed without breaking the wind shield glass and thus indicating that the vehicle is being operated without authority.

A further object of the invention is to provide a device employing a fragile casing to thus minimize the possibility of removing the device from the glass of a wind shield without breaking the casing.

And the invention has as a still further object to provide a device which will be neat and attractive in appearance and which may be easily and quickly operated to display a warning signal or to obscure the signal.

Other and incidental objects will appear hereinafter.

In the drawing:

Figure 1 is a fragmentary front elevation showing my improved device in position upon the glass of the wind shield of a motor vehicle of conventional design, Figure 2 is a perspective view showing the device detached, Figure 3 is a rear elevation of the casing of the device, Figure 4 is a vertical section on the line 4—4 of Figure 2, looking in the direction of the arrows, Figure 5 is a horizontal sectional view through the device, and Figure 6 is a vertical section on the line 6—6 of Figure 5, looking in the direction of the arrows.

Referring now more particularly to the drawing, I have shown my improved device in connection with the wind shield 10 of a motor vehicle of conventional design and in carrying the invention into effect, I employ a sign plate 11 which is mounted against the wind shield glass at its forward side and is provided with a sight opening 12. This plate carries a suitable inscription indicating that the occupancy, starting or driving of the vehicle is unauthorized in the event that a warning signal is displayed at the opening 12, the inscription being suitably imposed upon the plate. Mounted against the rear side of the wind shield glass in alinement with the plate is a signal casing 13, it being observed in this connection that the casing and plate are located in front of the vehicle steering wheel slightly toward the right of said wheel so that the device may be readily reached. The casing 13 is oblong in general contour and is preferably formed of glass, being provided at its ends with transverse bosses 14. Extending through the plate 11, the wind shield glass and partially through said bosses are bolts 15 provided at their forward ends with flat heads 16 coacting with the plate and, as will be observed upon reference to Figure 4, the bosses are recessed to accommodate the nuts upon the rear ends of the bolts. Closing the bosses are filler plugs 17 of cement or other approved material, the plugs, of course, serving to prevent access to said nuts. Accordingly, as will be seen, both the plate and the casing will be firmly secured upon the wind shield glass and preferably the plate is cemented against the glass at its forward side while the casing is cemented against the glass at its rear side for uniting the plate and casing directly with the glass. The casing is preferably formed with parallel top and bottom walls, parallel end walls, and parallel front and back walls, the back wall being provided at one end with a rearwardly directed integral box 18. Rising from the bottom wall is a short integral partition 19 and at one side of this partition, the back wall of the casing is provided with a clear or transparent area providing a sight window 20. The remaining area of the walls of the casing, as well as the box 18 and partition 19, are appropriately rendered translucent so that vision into the casing will be cut off. Formed in the front wall of the casing opposite the window 20 is an oblong opening 21 extending from end to end of the casing. This opening is provided in order that a lock 22 and associated parts may be fitted within the casing. This lock is mounted within the box 18 to extend into the casing, the partition 19 lying between the lock and the window 20 so that the partition will obscure the lock, and extending through the lock and through the back wall of the box are bolts 23 securing the lock in position. The lock may be of any appropriate character and comprises a bolt 24 while from the rear side of the lock projects a rotatable barrel 25 freely accommodated in a suitable opening in the back wall of the box and adapted to receive a key for operating the bolt. Suitably fixed to said bolt is a laterally projecting arm 26 extending across the partition 19 in a direction over the window 20 and hanging from said arm is a signal plate 27 upon each side of which the word Stop is preferably imposed.

As will now be readily understood in view of the preceding description, when the operator of the vehicle leaves the vehicle, the lock 22 may be operated for retracting the bolt 24 and, as shown in Figures 1 and 5, lowering the sign plate to active position between the sight opening 12 of the plate 11 and the window 20 of the casing. Accordingly, the word Stop will be displayed at said sight opening as well as at the window. Anyone attempting the theft of the vehicle must then, of necessity, operate the vehicle having the warning signal Stop displayed by the device so that the wrongful use of the vehicle will be visibly indicated. As will be perceived, such display of the warning signal will tend to minimize likelihood of theft of the vehicle. Upon return to the vehicle, the operator thereof may simply actuate the lock 22 for operating the bolt 24 and lifting the signal plate 27 within the casing to inactive position above the window 20 when the warning signal will be obscured. The device is, as previously indicated, preferably mounted upon the glass of the wind shield so that any attempt to wrongfully remove the device will more than likely result in breaking the wind shield. A wind shield broken by the wrongful removal of the device would, of course, plainly show and thus indicate that the vehicle was being wrongfully used. Furthermore, the casing 13 of the device is, for similar reasons, also preferably formed of glass so that attempt to remove the device would also more than likely result in breaking the casing and by bolting as well as cementing both the casing and plate 11 to the glass of the wind shield, the device will, to all intents and purposes, be permanently connected to the glass.

Having thus described the invention, what is claimed as new is:

1. The combination with a motor vehicle wind shield, of a signal casing secured directly to the glass of the wind shield whereby the removal of the casing will fracture the wind shield glass, and signaling means within the casing operable for displaying a signal visible through the casing.

2. The combination with a motor vehicle wind shield, of a sign plate mounted against the glass of the wind shield at its forward side and provided with a sight opening, a signal casing mounted against the glass of the wind shield at its rear side, and signaling means within the casing operable to display a signal visible through the wind shield and through said sight opening.

3. The combination with a motor vehicle wind shield, of a sign plate mounted against the glass of the wind shield at its forward side and provided with a sight opening, a signal casing mounted against the glass of the wind shield at its rear side, means extending through the wind shield glass connecting the plate and casing, and signaling means within the casing operable to display a signal visible through the wind shield and through said sight opening.

4. The combination with a motor vehicle wind shield, of a fragile signal casing secured directly to the glass of the wind shield whereby the removal of the casing will fracture the wind shield glass and the casing and signaling means operable within the casing for displaying a signal visible through the casing.

5. The combination with a motor vehicle wind shield, of a translucent signal casing secured to the glass of the wind shield and formed with a clear portion providing a sight window, the casing being frangible and being mounted directly upon the wind shield glass whereby removal of the casing will fracture the glass and the casing, and signaling means within the casing operable for displaying a signal visible through said window.

6. A signal of the character described including a signal casing provided with a sight window, a lock mounted within the casing and provided with a reciprocating bolt, an arm projecting laterally from said bolt, and a signal plate carried by the arm, the bolt being movable for bodily shifting said plate to a position in front of the window or to a position obscuring the plate.

7. The combination with a motor vehicle wind shield, of a signal casing permanently secured directly to the glass of the wind shield whereby removal of the casing will fracture the wind shield glass, and signaling means within the casing operable for displaying a signal visible through the casing.

In testimony whereof I affix my signature.

LUDWIG R. ZEPKA. [L. S.]